United States Patent
Akdag Cakir et al.

(10) Patent No.: US 10,427,612 B2
(45) Date of Patent: Oct. 1, 2019

(54) VEHICLE DOOR

(71) Applicant: FORD OTOMOTIV SANAYI ANONIM SIRKETI, Sancaktepe-Istanbul (TR)

(72) Inventors: Husniye Akdag Cakir, Izmit / Kocaeli (TR); Cihan Karadeniz, Golcuk/Kocaeli (TR); Halil Oelmez, Golcuk/Kocaeli (TR); Tamer Koc, Golcuk/Kocaeli (TR); Muharrem Yildiz, Golcuk/Kocaeli (TR); Nehir Yurt, Golcuk/Kocaeli (TR)

(73) Assignee: Ford Otomotiv Sanayi Anonim Sirketi (TR)

( * ) Notice: Subject to any disclaimer, the term of this patent is extended or adjusted under 35 U.S.C. 154(b) by 95 days.

(21) Appl. No.: 15/857,119

(22) Filed: Dec. 28, 2017

(65) Prior Publication Data

US 2018/0186295 A1 Jul. 5, 2018

(30) Foreign Application Priority Data

Dec. 30, 2016 (EP) ..................................... 16207466

(51) Int. Cl.
*B60R 11/06* (2006.01)
*B60R 7/04* (2006.01)
(Continued)

(52) U.S. Cl.
CPC ............. *B60R 7/046* (2013.01); *B60J 5/0413* (2013.01); *B60J 5/0469* (2013.01); *B60R 7/005* (2013.01);
(Continued)

(58) Field of Classification Search
CPC ....... B60R 22/04; B60R 25/1003; B60R 3/02; B60R 13/0243; Y10T 292/1047;
(Continued)

(56) References Cited

U.S. PATENT DOCUMENTS 5,072,983 A * 12/1991 Muroi ...................... B60N 2/78
296/37.13
5,845,888 A 12/1998 Anderson
(Continued)

FOREIGN PATENT DOCUMENTS

DE 8027558 U1 2/1981
DE 10047843 A1 4/2002
(Continued)

OTHER PUBLICATIONS

English Machine Translation of DE10047843A1.
(Continued)

*Primary Examiner* — Kiran B Patel
(74) *Attorney, Agent, or Firm* — Vichit Chea; King & Schickli, PLLC

(57) ABSTRACT

A vehicle door includes an inner panel and a trim panel portion connected to the inner panel. The trim panel portion includes an inner surface facing the inner panel. At least one holding device for an object is disposed on the inner surface and the trim panel portion is pivotable between a closed position adjacent the inner panel and an open position, in which the holding device is accessible, wherein a storage space for the object to be held by the holding device is provided in both positions.

13 Claims, 2 Drawing Sheets

(51) Int. Cl.
*B60J 5/04* (2006.01)
*B60R 13/02* (2006.01)
*B60R 7/00* (2006.01)
*B60R 7/08* (2006.01)

(52) U.S. Cl.
CPC .......... *B60R 7/081* (2013.01); *B60R 13/0243* (2013.01); *B60R 13/0275* (2013.01); *B60R 2013/0287* (2013.01)

(58) Field of Classification Search
CPC ............ E05Y 2900/531; E05Y 2900/55; B60J 5/0416; B60J 10/24; B29L 2031/3014
USPC ........................ 296/37.8, 146.1, 146.5, 146.7
See application file for complete search history.

(56) References Cited

U.S. PATENT DOCUMENTS

| | | | | |
|---|---|---|---|---|
| 6,116,672 | A * | 9/2000 | Cannon | B60R 7/046 224/547 |
| 6,145,919 | A * | 11/2000 | Mysliwiec | B60J 5/06 296/153 |
| 6,196,605 | B1 * | 3/2001 | Baldas | B60R 7/046 224/543 |
| 6,196,606 | B1 * | 3/2001 | McGoldrick | B60R 7/046 296/146.7 |
| 6,447,047 | B1 * | 9/2002 | Marcovecchio | B60R 13/0243 296/146.6 |
| 6,474,721 | B2 * | 11/2002 | Nishikawa | B60J 5/0416 296/146.6 |
| 6,692,053 | B1 * | 2/2004 | Smith | B60N 3/102 224/282 |
| 6,971,698 | B1 * | 12/2005 | King | B60R 7/046 224/544 |
| 7,111,894 | B2 * | 9/2006 | Kora | B60J 5/0416 296/146.1 |
| 7,494,033 | B2 | 2/2009 | Kaiser | |
| 8,109,558 | B2 * | 2/2012 | Nakamori | B60J 5/0443 296/146.6 |
| 8,210,590 | B1 * | 7/2012 | Moberg | B60J 5/042 224/544 |
| D704,612 | S | 5/2014 | Nakao | |
| D710,282 | S | 8/2014 | Min et al. | |
| D712,813 | S | 9/2014 | Tanaka et al. | |
| D716,210 | S | 10/2014 | Ishikawa et al. | |
| 9,238,440 | B1 * | 1/2016 | Bowser | B60R 7/084 |
| 2002/0179660 | A1 * | 12/2002 | Schaal | B60N 3/083 224/282 |
| 2008/0122229 | A1 | 5/2008 | Choi et al. | |
| 2012/0299324 | A1 * | 11/2012 | Langenbacher | B60N 3/101 296/37.13 |
| 2013/0155708 | A1 * | 6/2013 | Moberg | B60Q 3/217 362/488 |
| 2014/0138978 | A1 * | 5/2014 | Langenbacher | B60N 3/101 296/37.13 |
| 2018/0319346 | A1 * | 11/2018 | Siqueira | B60R 7/04 |

FOREIGN PATENT DOCUMENTS

| | | |
|---|---|---|
| DE | 102013001496 A1 | 7/2014 |
| EP | 1097861 A2 | 5/2001 |
| EP | 2759283 A1 | 7/2014 |
| FR | 2898312 A1 | 9/2007 |
| WO | 2005058649 A1 | 6/2005 |

OTHER PUBLICATIONS

English Machine Translation of DE102013001496A1.
English Machine Translation of DE8027558U1.
English Machine Translation of EP1097861A2.
English Machine Translation of EP2759283A1.
English Machine Translation of FR2898312A1.

* cited by examiner

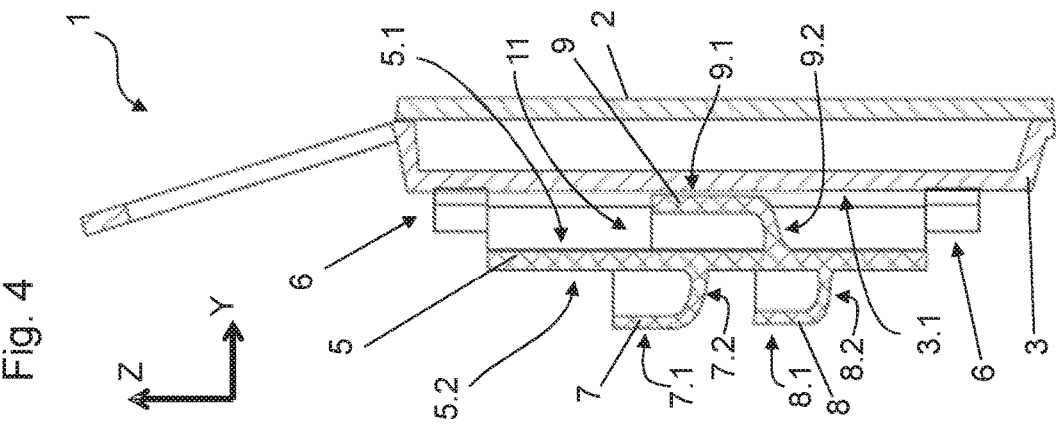
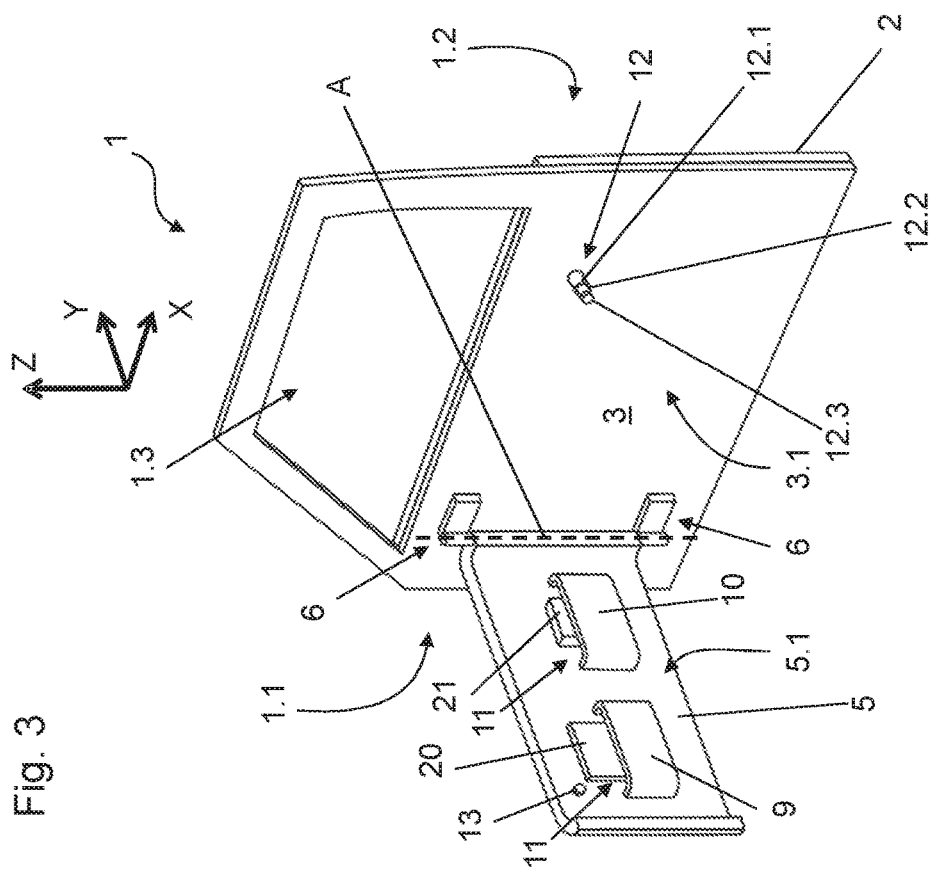

VEHICLE DOOR

TECHNICAL FIELD

The present invention relates to a vehicle door.

BACKGROUND

In modern vehicles, one aspect of comfort is to provide enough storage space within the passenger compartment. This pertains particularly, but not exclusively, to the front row of the vehicle where the driver is seated. There is a constant need for storage space that is easily accessible. Furthermore, any items stored in such a storage space should not hinder the driver as he operates the vehicle. Also, for aesthetic and/or privacy reasons, some items should be hidden from view when they are stored.

Apart from the common glovebox, it is known to provide storage or holding devices e.g. on the dashboard, in the centre console or in the doors. In the latter case, the storage device is normally provided on a trim panel of the respective door, which trim panel is fixed to an inner panel. For example, the storage device may be integrally formed with the trim panel, which is normally made of some kind of plastic material. Apart from "static" holding devices having a fixed position and geometry, foldaway or extensible devices are known which may be extended in a position for use and retracted or folded away when they are not needed. In such a retracted position, the device is space-saving and usually hidden from view, which is a aesthetically favorable. However, the device loses its holding or storing capability, i.e. any items have to be taken out before the device is retracted.

U.S. Pat. No. 6,692,053 B1 discloses a storage and holding system for a vehicle, which may be installed e.g. in a door trim panel of a vehicle door. The system comprises a structure which forms a cavity with an opening. A flap can be moved between a covering position in which it covers a portion of the opening and an access position in which it extends into the cavity to provide access to the cavity. A lower component can be moved between a closed position in which it covers a second portion of the opening and a self-supported position in which it can perform a holding function.

U.S. Pat. No. 7,494,033 B2 discloses a storage compartment for insertion within and upon an interior panel of a vehicle door. The compartment comprises a back panel member, a front panel member and a center member for mechanical engagement within and fixed upon a surface of an inner panel of the vehicle door. The front and back panel members form front and back inner boundaries of an interior portion of the storage compartment. The back member is adapted to telescope inwardly and outwardly within the center member and the storage compartment is at least partially recessed within an interior portion of the vehicle door.

U.S. Pat. No. 8,210,590 B1 discloses a trim panel assembly for a vehicle having a pocket door that is moveable between a reduced width position and an increased width position. The trim panel assembly includes a panel having a recessed portion. A pocket door is mounted over at least a portion of the recessed portion such that the pocket door and the recessed portion define a storage pocket. The pocket door is mounted for translational movement between a first position, in which the storage pocket has a first width defined between an outboard side wall and an inboard side wall, and a second position, in which the width of the storage pocket is increased. This increase in width occurs over the vertical extent of the storage pocket.

DE 10 2013 001 496 A1 discloses a vehicle door with a door trim panel, which has a parapet portion with a lockable door pocket, wherein the parapet portion extends along a parapet line of a vehicle. The door pocket is arranged on the hinge-side end face of the vehicle door. The door pocket is formed extending in the direction of a vehicle vertical direction below the parapet portion up to an area corresponding to a lower edge of a control panel of the vehicle.

U.S. Pat. No. 5,845,888 A discloses a container holder assembly for a vehicle, e.g. for a vehicle door. The assembly comprises a frame subassembly, a slide subassembly and a container holder assembly. The frame subassembly comprises a bezel and a slide-receiving support. The slide subassembly comprises a member slideably extending in the support and legs extending therefrom in parallel spaced relationship, with pins extending from these legs. The container holder subassembly includes a parallelogram linkage, in which at least two of the links form a container support base and container support ring, which is coupled in parallel spaced relationship to the container support base.

EP 1 097 861 A2 discloses a passenger car with three rows of seats, wherein the middle row of seats is arranged facing against the direction of travel. Each row of seats is limited on each side by an interior trim. The interior trims of the rear row and the front row are each fastened to a rear door or to a front door which are mounted on the vehicle. The interior trims of the middle row are each arranged at a side wall located between the front door and rear door. To provide improved serviceability, the interior trims of the middle row of seats are each attached to the vehicle, while the side walls are each mounted in the manner of a side door of the vehicle. Thereby, when the sidewall is open, an outer side of the interior trim of the center row side wall and an inner side of the interior trim are accessible.

In light of the above-mentioned prior art, the provision of additional and/or flexible storage space for a vehicle interior still offers room for improvement. In particular, it is desirable that such storage space does not hinder the operation of the vehicle.

SUMMARY

Therefore it is an object of the present invention to provide additional storage space for a vehicle interior.

It should be noted that features and measures that are mentioned individually in the following description may be combined in any technically reasonable way and point out further embodiments of the new and improved vehicle door. The description further characterizes and specifies the vehicle door, in particular in context with the figures.

The vehicle door includes an inner panel and a trim panel portion connected thereto and having an inner surface facing the inner panel. Normally, the vehicle door is a part of a road vehicle, especially a passenger car. The inner panel is an element which, usually together with an outer panel, provides for the mechanical stability of the vehicle door. Usually, the inner panel is at least partially made of metal sheet, e.g. steel or aluminum. Naturally, it is disposed towards the interior of the vehicle, while the outer panel is disposed towards the outside. The trim panel portion is at least a part of a trim panel disposed towards the interior with respect to the inner panel. One main function of the trim panel (and thus, the trim panel portion) is to provide an aesthetically appealing appearance of the vehicle door towards the interior. It may at least partially be made of plastic material, but at least the surface of the trim panel portion may comprise other materials like fabric, leather, artificial leather or the like. Optionally, the trim panel portion also comprises a door handle, although such a door handle may also be disposed elsewhere. The trim panel portion is connected to the inner panel and has an inner surface facing the inner panel. In other words, when the vehicle door is closed, this inner surface faces the outside of the vehicle. It should be noted that if the inner panel comprises at least one opening, some part of the inner surface may, strictly speaking, not face the inner panel but the outer panel.

At least one holding device for an object is disposed on the inner surface. Such a holding device can be any device or arrangement that is adapted to hold the object, usually mechanically. However, the holding device could also work by magnetic force, gecko effect or other forces. This at least one holding device is disposed on the above-mentioned inner surface. In particular, it may be fixedly connected to the inner surface. The object may be any item a user wants to store temporarily or permanently within the vehicle door, e.g. a map, a book, a CD etc.

The trim panel portion is pivotable between a closed position adjacent the inner panel and an open position, in which the holding device is accessible, wherein a storage space for the object to be held by the holding device is provided in both positions. In other words, the trim panel is pivotably connected to the inner panel, i.e. it is not fixedly connected but in such a way that allows for a pivoting motion with respect to the inner panel. Due to its pivotable connection, the trim panel portion can be regarded as a "door on a door" with respect to the vehicle door. To this respect, the position in which the trim panel portion is positioned adjacent the inner panel can be regarded as the closed position. This corresponds more or less to the position of the trim panel and the inner panel known in the art. Of all the positions possible along the range-of-motion of the trim panel portion, this is the position closest to the inner panel however, the closed position does not have to correspond to a single angular value, but could also refer to a small angular interval. For instance, if the trim panel portion is pivotable about a total angle of 60°, the closed position could correspond to an angular interval of e.g. 2° or 5°.

In the closed position, the holding device and the storage space are located between the trim panel portion and the inner panel (or at least partially the outer panel), which means that an object held by the holding device is at least partially hidden from view. In other words, it is at least partially concealed by the trim panel portion, which may be desirable for aesthetic and/or privacy reasons. In particular, the storage space may be at least partially, mainly or even completely enclosed between the trim panel portion and the inner panel. Also, the holding device itself may at least partially, mainly or completely be enclosed between the trim panel portion and the inner panel. Due to this configuration, the holding device is normally not accessible in the closed position. I.e. although the object may be held by the holding device, it can normally not be removed from or placed on the holding device.

However, the trim panel portion is pivotable from the closed position to the open position (and vice versa). In this open position, the trim panel portion is pivoted away from the inner panel so that the inner surface with the holding device is accessible. In this open position, any object may be removed from or placed on the holding device. It is understood that depending on the pivot angle, the inner surface, strictly speaking, may not be facing the inner panel in the open position. Thus, to be precise, the inner surface faces the inner panel at least in the above-mentioned closed position. Since the inner surface of the trim panel portion and an opposite inner surface of the inner panel are visible in the open position, these surfaces may be provided with a favorable appearance. For instance, the inner panel itself may be provided with some kind of decorative lining that is connected to a metal sheet of the inner panel. In the following, moving the trim panel portion towards or into the open position is also referred to as "opening the trim panel portion".

A storage space for the object held by the holding device is provided both in the open position and in the closed position. I.e., the holding device is operational in both positions, so that the object can remain in or on the holding device in the closed position. This differs from foldaway holding devices known in the art, where the object has to be removed before the holding device is moved to a retracted position. It should be noted that the holding device is adapted to hold the object in the closed position as well as in the open position, i.e. the holding function is not dependent on any cooperation of the trim panel portion with the inner panel (or the outer panel). Also, in some embodiments, the storage space may be larger than holding device e.g. so that the object can protrude above the holding device.

The inventive vehicle door provides for additional storage space between the inner panel/outer panel and the trim panel portion, which storage space is easily accessible by moving the trim panel portion to the open position. However, in the closed position, while the storage space is still available, any objects stored therein may be partially or completely hidden from view. Also, such objects are well protected between the inner panel and the trim panel portion.

Apart from the inventive storage space between the inner panel and the trim panel portion, it may be desirable to have storage space that is accessible without opening the trim panel portion. Therefore, in one embodiment, at least one holding device is disposed on an outer surface of the trim panel portion opposite the inner surface. It is understood that this outer surface actually faces inwards, i.e. towards the interior of the vehicle.

As mentioned above, the holding device may work based on different mechanisms. Depending on the working principle, there are different options for the construction of the holding device. In some cases, e.g. when the working principle is based on a magnetic force, the holding device may be pre-manufactured as one or several separate parts, which are connected to the respective inner or outer surface. In another embodiment, e.g. when the holding device works mechanically by providing a box or other receptacle for the object, it is preferred that least one holding device is integrally formed with the inner surface or the outer surface. For instance, if the trim panel portion is at least partially molded from a plastic material, it is relatively easy to integrally form such a receptacle.

It is preferred that at least one holding device has bottom and sidewall portions for supporting the object. Such a holding device may also be referred to as a receptacle or a vessel. This type of holding device is relatively easy to manufacture and is suitable for holding objects of any material and surface structure. The sidewall portions do not have to be continuously connected to the bottom portion, but there may be an opening in between. In such a case, the sidewall portion resembles a railing, which is suitable for holding the object is long as the object is bigger than the opening.

A plurality of holding devices may be disposed on the inner surface. Any kind of configuration is conceivable, for instance holding devices that are disposed next to each other or spaced-apart, holding devices that are positioned vertically or horizontally with respect to each other, holding devices having different shapes and dimensions etc.

Referring to the mounting position of the vehicle door in the vehicle, it is preferred that the trim panel portion is pivotable about a vertical pivot axis. In other words, in a road vehicle, the pivot axis is parallel to the Z axis of the vehicle. This is advantageous in that the orientation of the at least one holding device with respect to the direction of gravity does not change when the trim panel portion is pivoted between the closed position and the open position.

In this context, it is preferred that the pivot axis is disposed towards a hinge side of the vehicle door. In other words, the pivot axis is disposed on that end of the trim panel portion that is closer to the hinge side of the vehicle door, i.e. the side on which the hinge(s) is/are disposed by which the vehicle door is connected to the vehicle body. However, there may be some configurations where it is also advantageous that the pivot axis is disposed away from the hinge side, e.g. if the hinge side is the rear side of the vehicle door but a seat next to the vehicle door is facing forward (or the other way around).

In particular, the vehicle door may be a front door. Normally, there is an increased need for the driver of the vehicle to have additional storage space. Also, in many motor vehicles, the front doors are somewhat larger than the rear doors (if present), wherefore it is easier and more effective to provide additional storage between the inner panel and the trim panel portion.

In order to prevent any unwanted movement of the trim panel portion, it is preferred that the trim panel portion is securable to the inner panel in the closed position by a locking mechanism. Herein, "securable" means that, as long as a user (e.g. the driver of the vehicle) does not intervene, the trim panel portion is prevented from moving out of the closed position (into or towards the open position). If the closed position refers to a small angular interval as discussed above, the locking mechanism prevents the pivot angle of the trim panel portion from exceeding this interval. In other words, the locking mechanism may allow for a minor pivot movement, although this movement is restricted. The locking mechanism could work mechanically, e.g. by a snap or latch connection, a hook and loop fastener or the like. However, it could also work by magnetic interaction, e.g. by a magnet that is connected to the inner panel and a ferromagnetic element that is connected to the trim panel portion.

It is preferred that in the closed position, the locking mechanism is entirely located between the trim panel portion and the inner panel. Thus, the locking mechanism is not visible from the inside of the vehicle, which is aesthetically desirable. Also, this can protect the locking mechanism from mechanical damage. "Between the trim panel portion and the inner panel" also refers to embodiments where parts of the locking mechanism are formed as a single piece with the trim panel portion or the inner panel. In this case, the respective parts are located on an inner surface and therefore are not visible from the outside in the closed position.

In order to facilitate the operation of the vehicle door, it is preferred that it comprises an opener element for moving the trim panel portion from the closed position towards the open position. Such an opener element could comprise an actuator driven by an energy source of the vehicle. However, it is preferred that the opener element comprises an elastic element like a spring, which stores mechanical energy applied by the user as he moves the trim panel portion to the closed position and releases that mechanical energy in order to move the trim panel portion towards the open position. Full opening may require some manual assistance by the user.

In one preferred embodiment, the locking mechanism comprises a push opener. This kind of mechanism, which is also known as a push-push locking mechanism, normally has a stationary part and a movable, spring-loaded plunger. For instance, the stationary part with the plunger may be fixed to the inner panel. When the trim panel portion is in the open position, the plunger will be in an extended position. As the user pushes the trim panel portion into the closed position, the inner surface of the trim panel portion exerts a force on the plunger which pushes it into a retracted position, where it is secured until further action by the user. In order to reopen the trim panel portion, the user pushes it towards the inner panel, which moves the plunger even beyond the retracted position. As the user releases the pushing force, the plunger does not return to the retracted position but moves to the extended position, thereby moving the trim panel portion from the closed position towards the open position. In order to maintain contact between the plunger and the trim panel portion in the closed position, a magnet may be installed to the tip of the plunger and corresponding ferromagnetic element may be installed to a corresponding position on the trim panel portion (or vice versa).

BRIEF DESCRIPTION OF THE DRAWING FIGURES

Further advantageous details and effects of the invention are explained further in the following with reference to an embodiment shown in the figures, wherein:

FIG. 3 shows a perspective view corresponding to FIG. 2 with the trim panel portion in an open position; and FIG. 4 shows a cross-section view of the vehicle door.

In the various figures, like parts are always associated with the same reference numerals, wherefore they are usually depicted only once.

DETAILED DESCRIPTION

Figure 1:
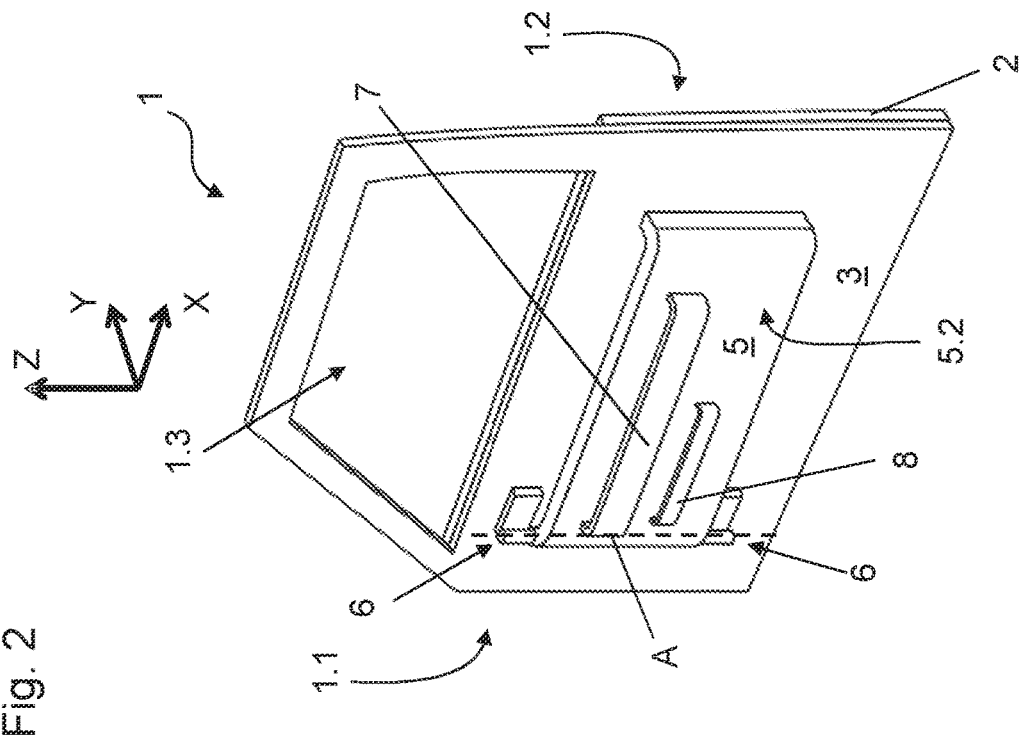
FIG. 1 shows a perspective view of an inventive vehicle door with a trim panel portion in a closed position.
Figure 2:
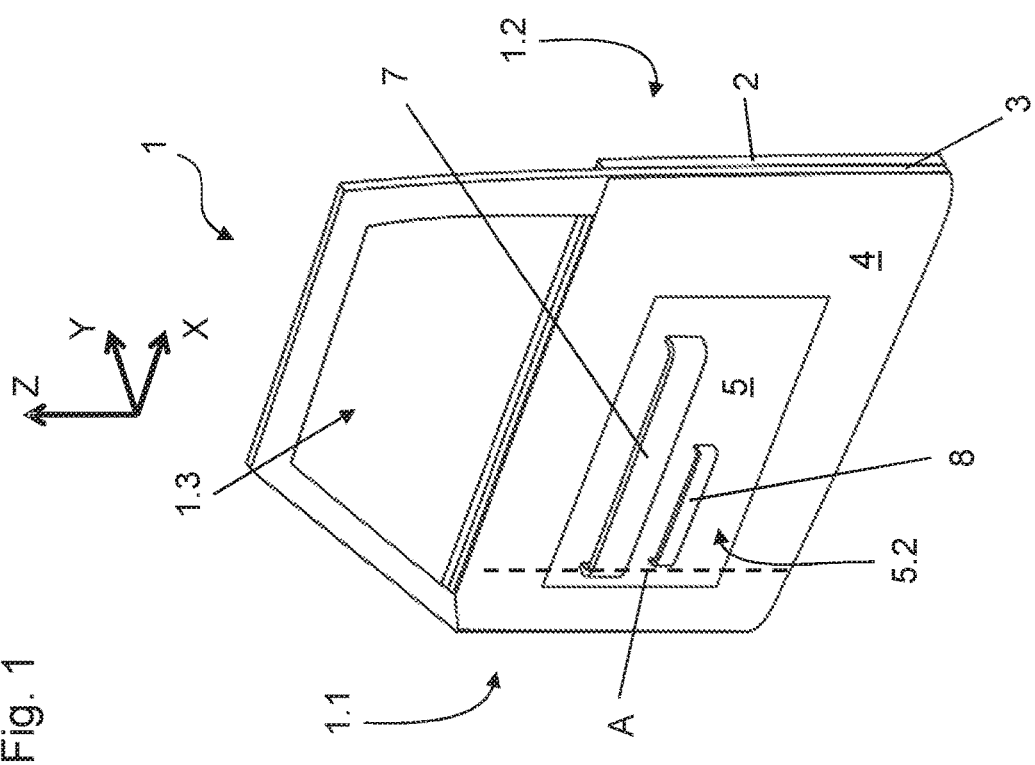
FIG. 2 shows a perspective view corresponding to FIG. 1 with parts of the vehicle door removed.

FIG. 1 shows a perspective view of a vehicle door 1 which comprises an outer panel and an inner panel 3, both of which are mostly made of formed metal sheet. In the embodiment shown, the vehicle door 1 is a front door with a hinge side 1.1 facing forward and a lock side 1.2 facing backwards. Below a window opening 1.3, a stationary trim panel frame 4 and a movable trim panel portion 5 are connected to the inner panel 3. While the trim panel frame 4 is fixedly connected to the inner panel 3, the trim panel portion 5 is connected via two hinges 6, which define a vertical pivot axis A. In fully assembled state, which is shown in FIG. 1, the hinges 6 are hidden by the trim panel frame 4. For sake of clarity, FIG. 2 shows the vehicle door 1 without the trim panel frame 4. Both the trim panel frame 4 and the trim panel portion 5 are mostly made of plastic material, but they could also at least partially be covered with fabric, leather or the like. FIG. 1 shows a closed position of the trim panel portion 5, where it is positioned adjacent the inner panel 3. In this closed position, an inner surface 5.1 of the trim panel portion 5 faces the inner panel 3. This inner surface 5.1 is only visible in FIGS. 3 and 4. An outer surface 5.2 of the trim panel portion 5 is positioned opposite the inner surface 5.1 and normally faces the interior of the vehicle. A first receptacle 7 and a second receptacle 8 are disposed on the outer surface 5.1. These receptacles, which may be used as holding devices for various kinds of objects 20, 21, are accessible to a passenger or a driver even when the trim panel portion 5 is in the closed position. Also, any object 20, 21 contained therein is always visible.

FIG. 3 shows an open position of the trim panel portion 5, which corresponds to a pivot movement about the pivot axis A with respect to the closed position. As can be seen in FIG. 3 and in the cross-section view of FIG. 4, a third receptacle 9 and a fourth receptacle 10 are disposed on the inner surface 5.1 of the trim panel portion 5. These receptacles may be used as holding devices, too. As shown in FIG. 4, all receptacles 7, 8, 9, 10 comprise a sidewall portion 7.1, 8.1, 9.1 and a bottom portion 7.2, 8.2, 9.2. Receptacles 10 is hidden in the view of FIG. 4. Also receptacles 7, 8, 9, 10 are formed as a single piece with the trim panel portion 5. In particular, the third and fourth receptacle 9, 10 therefore maintain their position and configuration with respect to the trim panel portion 5, irrespective of the position of the trim panel portion 5. In particular, these receptacles 9, 10 each provide a storage space 11 for an object (e.g. a map 20, a book 21, a CD etc.) even in the closed position. In this closed position, the storage space 11 is enclosed between the inner panel 3 and the trim panel portion 5 (and, partially, the trim panel frame 4). Any objects 20, 21 positioned in this storage space 11 are hidden from view and are also protected from mechanical damage, dirt or other detrimental influences from the interior of the vehicle.

As shown in FIG. 3, a push opener 12 is disposed on a surface 3.1 of the inner panel 3 which faces the inside of the vehicle. This push opener 12, together with a ferromagnetic element 13, which is connected to the inner surface 5.1 of the trim panel portion 5, constitutes a locking mechanism by which the trim panel portion 5 can be secured in the closed position. The push opener 12 has a stationary part 12.1, a spring-loaded movable plunger 12.2 and a magnet 12.3 connected to the plunger 12.2. As the trim panel portion 5 is moved into the closed position, the ferromagnetic element 13 makes contact with the magnet 12.3 and the plunger 12.2 is moved against a spring force from an extended position to a retracted position. This retracted position corresponds to the closed position of the trim panel portion 5.

In order to open the trim panel portion 5, a user applies a pushing force to the trim panel portion 5 (e.g. in the region of the ferromagnetic element 13), by which the plunger is moved minimally beyond the retracted position and, as the pushing force is released, the spring force moves the plunger back into the extended position, wherefore the trim panel portion 5 is moved towards the open position. In order to fully open the trim panel portion 5, the user may now grasp the rim of the trim panel portion 5 and apply a pulling force.

The invention claimed is:

1. A vehicle door, comprising:
   an inner panel;
   a trim panel portion connected to said inner panel and having an inner surface facing said inner panel; and
   at least one holding device for an object disposed on said inner surface whereby said trim panel portion is pivotable between a closed position adjacent said inner panel and an open position, in which said holding device is accessible, wherein a storage space for said object to be held by said holding device is provided in said closed position and said open position.

2. The vehicle door according to claim 1,
   characterized by said at least one holding device being disposed on an outer surface of said trim panel portion opposite said inner surface.

3. The vehicle door according to claim 2, characterized in that said at least one holding device is integrally formed with said inner surface.

4. The vehicle door according to claim 3 characterized in that said at least one holding device is integrally formed with said outer surface.

5. The vehicle door according to claim 1, characterized in that at least one holding device has bottom portions and sidewall portions for supporting said object.

6. The vehicle door according to claim 1, characterized in that a plurality of holding devices are disposed on said inner surface.

7. The vehicle door according to claim 1, characterized in that said trim panel portion is pivotable about a vertical pivot axis.

8. The vehicle door according to claim 7, characterized in that said vertical pivot axis is disposed towards a hinge side of the vehicle door.

9. The vehicle door according claim 1, characterized in that said vehicle door is a front door.

10. The vehicle door according to claim 1,
    characterized in that said trim panel portion is securable to said inner panel in the closed position by a locking mechanism.

11. The vehicle door according to claim 10, characterized in that in the closed position, said locking mechanism is located between said trim panel portion and said inner panel.

12. The vehicle door according to claim 11, characterized by an opener element for moving said trim panel portion from said closed position towards said open position.

13. The vehicle door according to claim 12, characterized in that said locking mechanism comprises a push opener.

* * * * *